W. L. TOBEY.
TIRE REMOVING DEVICE.
APPLICATION FILED OCT. 16, 1911.

1,036,748.

Patented Aug. 27, 1912.

Witnesses:

Inventor:
William L. Tobey,

UNITED STATES PATENT OFFICE.

WILLIAM L. TOBEY, OF WINTHROP, MASSACHUSETTS.

TIRE-REMOVING DEVICE.

1,036,748.     Specification of Letters Patent.     Patented Aug. 27, 1912.

Application filed October 16, 1911. Serial No. 654,971.

*To all whom it may concern:*

Be it known that I, WILLIAM L. TOBEY, a citizen of the United States, and a resident of Winthrop, in the county of Suffolk and Commonwealth of Massachusetts, have invented an Improvement in Tire-Removing Devices, of which the following description, in connection with the accompanying drawings, is a specification, like characters on the drawings representing like parts.

This invention aims to provide a novel device to facilitate the removal from wheel rims of automobiles and the like of tires of the clencher or like types.

Figure 1:
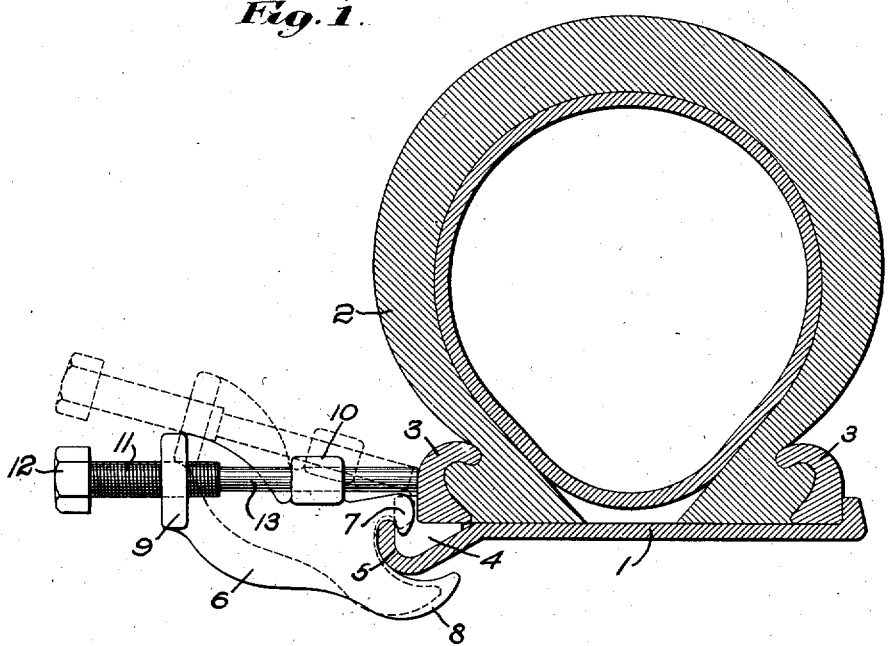
Figure 2:
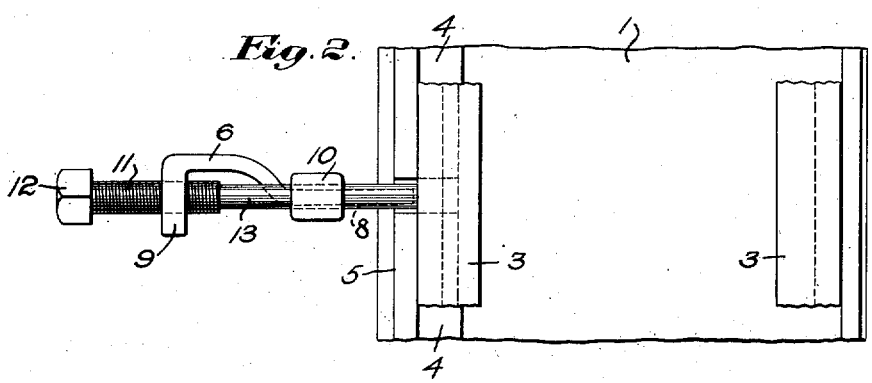

The nature of the invention will be best understood from a description of an illustrative embodiment thereof shown in the accompanying drawing, wherein:

Figure 1, in cross section, shows a conventional wheel rim with a clencher tire and its holding and locking means in position thereof, this figure showing a device embodying my invention applied in position for use; and, Fig. 2, a detail showing some of the parts in plan view.

Referring to the drawing, the wheel rim 1, the tire 2 of clencher type positioned thereon, the clencher rings 3—3 seated upon said rim and engaging the lips of said tire, and the split locking ring 4 seated in a channel 5 of the wheel rim are and may be of any desired shape, construction and materials, or as commonly used at the present time.

To release the tire it is necessary to force inward one of the detachable flanges 3, to free the split locking ring 4 at least for a considerable distance in the vicinity of the point at which said locking ring is split, in order that the latter may be released and withdrawn from its seat in the channel of the wheel rim, thereby to release the adjacent detachable flange and permit the latter to be withdrawn laterally to free the tire. Much difficulty is ordinarily experienced in pressing this detachable flange inwardly in the first instance, to free the split locking ring, this difficulty arising from the stiffness and immobility of the parts and also because of the inability of the chauffeur or operator conveniently to engage the parts for moving them. My present invention aims to provide a convenient and preferably portable device which may be applied readily for assisting in or actually moving the parts to facilitate the removal of the tire. To this end the device, in the embodiment of my invention herein shown, comprises a holder or back plate 6 which may be struck up from sheet metal or otherwise suitably formed, which holder is provided at its inner end with a hook 7 adapted to overlie and engage the lip on the wheel rim which constitutes one side of the channel in which the locking ring 4 is seated. Below this hook 7 said holder is formed to provide a downwardly and forwardly projecting holder anchoring seat or toe 8 having a supporting surface $8^a$, adapted to seat against and to reach under the adjacent edge of the wheel rim at the same side of the median or spoke plane of the wheel as the lip which is engaged by said hook. This anchoring seat prevents the inner end of the holder from riding up over the wheel rim edge when the displacing member engages the rim or other wheel member and renders the device self-sustaining in position on the wheel rim as shown in Fig. 1, enabling the operator to use both hands for removing the tire, or other wheel member. At its upper edge said holder is provided with two lugs 9 and 10, in the former of which is threaded an adjusting screw or device 11 provided at its outer end with a hexagonal or other head 12 or means by which it may be readily rotated, said screw at its inner end being provided with a relatively long, smooth shank 13 which passes loosely through the lug 10 and is adapted at its inner end to act upon the outer face of the adjacent detachable flange 3.

This device, as shown, is so small and portable that it may be conveniently carried in any automobile kit, or even in the pocket of the user.

Should occasion arise for removing the tire the device is applied to the wheel rim as indicated in dotted lines (Fig. 1) by hooking the hooked portion 7 over the lip of the wheel rim in the space usually presented between the adjoining ends of the split locking ring 4. The device is then rocked down until a portion of the throat formed between the hook 7 and anchoring seat comes into engagement with the outside of the channel 5 (see full line position, Fig. 1). This will arrest further downward rocking movement of the holder and the latter will hang, unassisted by the hand, on the lip of the channel like a bracket. The rocking movement just described also acts to bring the inner end of the adjusting screw 11 opposite the detachable flange 3. By now turning the adjusting screw in the proper direction the inner end of the screw is advanced against the detachable flange 3 to push the latter bodily and for a sufficient distance in either direction inward, together with the adjacent side of the tire, to uncover the adjacent ends of the split locking ring 4 for a sufficient distance at either side the split portion to permit the ends to be freed from the detachable flange, whereupon said locking ring may be readily withdrawn, the detachable flange freed, and the tire rendered removable. After the locking ring has been removed, which may be done without disturbing the position of the holder 6, the latter is removed in order to permit or facilitate the removal of the detachable flange.

It will be observed that an operation of the device disclosed offers three points of effective engagement or support: (1) the adjusting screw at its point of contact with the detachable flange; (2) point of engagement of the hook 7 with the lip 5; and (3) point of engagement of the supporting surface at 8ª with the lip 5. These points of engagement, however, would of course vary in relative position and action according to the particular embodiment of the device employed and manner in which it is to be applied to the wheel, tire, or other parts to be engaged thereby. It will be observed also that the adjusting device and at least one of the engaging portions of the holder are oppositely active; that is to say, in the embodiment shown they act in opposite directions, the holder point acting against an inner surface of the wheel part engaged by it; said points of engagement being nevertheless at one side of the wheel.

It will be apparent that the screw 11, when urged against the detachable flange 3, tends to rock the holder in a contra-clockwise direction about the fulcrum point of engagement of the hook 7 with the inside of the channel 5, but this rocking is prevented by the stop engagement of the anchoring seat 8 with the channel. The reaction thrust of the screw is resisted by the outward pressure of the hook 7 which nips or catches against the lip of the channel 5. The hook in resisting the screw will not ride up over the edge of the channel 5, but on the contrary will be drawn into more secure engagement therewith. This is due to the curve or shape of the seat 8 which contacts with the under surface of the channel 5 and tends to crown the channel rim into the throat of the holder and thereby cam or draw the hook 7 down into more intimate engagement with the lip of the channel with a force proportionate to the increase in pressure on the screw 11. The only way which the hook 7 can be removed from the flange 5 is by tilting the holder upward substantially as shown in dotted lines in Fig. 1. In order that this may be effected it is first necessary to retreat the screw 11 since the latter when engaging the detachable flange 3 prevents upward rocking of the holder. Another advantage of the anchoring seat is that it resists lateral rocking of the holder on the channel such as would have a tendency to occur when the screw 11 is rotated. This lateral resisting action of the toe, therefore, contributes to the rendering of the device self-sustaining on the channel.

The device, in the form shown, is compact; furnishes any required power necessary for the purpose; is readily engaged with and disengaged from that part of the wheel with which it is intended to coöperate; and is conveniently operated when in position.

My invention obviously is not restricted to the particular embodiment shown.

Having described one embodiment of my invention, and without limiting myself to details, what I claim and desire to secure by Letters Patent is:

1. A tire removing device comprising, in combination, a holder having a hook sufficiently thin for presentation between the ends of a split locking ring into engagement with the inner face of a wheel channel and means adjustable in one plane relatively to said holder for dislocating a tire holding member, said holder having a toe formed for engagement with the outer under face of said channel for preventing displacement of said holder.

2. A tire removing device comprising, in combination, a holder for engagement with the inner face of the lip of a wheel channel, and a screw adjustable relatively to said holder for displacing a tire holding member, said holder comprising a strip of sheet metal having a tongue projecting from one edge and looped to form an eye and having a portion offset and an end bent to come opposite said eye and threaded to receive the screw which is guided by said eye and the forward end of the strip having opposed curved or hook surfaces to engage over and under the rim.

3. A tire removing device comprising, in combination, a holder for engagement with the inner face of the lip of a wheel channel, and a screw adjustable relatively to said holder for displacing a tire holding member, said holder comprising a thin plate having an eye portion projecting from one edge and having a portion brought opposite said eye and threaded to receive the screw which is guided by said eye and the forward end of the plate having opposed curved or hook surfaces to engage over and under the rim.

In testimony whereof, I have signed my name to this specification, in the presence of two subscrbing witnesses.

WILLIAM L. TOBEY.

Witnesses:
FREDERICK L. EMERY,
ROBERT H. KAMMLER.

---

Correction in Letters Patent No. 1,036,748.

It is hereby certified that in Letters Patent No. 1,036,748, granted August 27, 1912, upon the application of William L. Tobey, of Winthrop, Massachusetts, for an improvement in "Tire-Removing Devices," an error appears in the printed specification requiring correction as follows: Page 2, line 63, for the word "crown" read *crowd;* and that the said Letters Patent should be read with this correction therein that the same may conform to the record of the case in the Patent Office.

Signed and sealed this 17th day of September, A. D., 1912.

[SEAL.]

C. C. BILLINGS,
*Acting Commissioner of Patents.* ing an eye portion projecting from one edge and having a portion brought opposite said eye and threaded to receive the screw which is guided by said eye and the forward end
5 of the plate having opposed curved or hook surfaces to engage over and under the rim.

In testimony whereof, I have signed my name to this specification, in the presence of two subscrbing witnesses.

WILLIAM L. TOBEY.

Witnesses:
FREDERICK L. EMERY,
ROBERT H. KAMMLER.

Correction in Letters Patent No. 1,036,748.

It is hereby certified that in Letters Patent No. 1,036,748, granted August 27, 1912, upon the application of William L. Tobey, of Winthrop, Massachusetts, for an improvement in "Tire-Removing Devices," an error appears in the printed specification requiring correction as follows: Page 2, line 63, for the word "crown" read *crowd;* and that the said Letters Patent should be read with this correction therein that the same may conform to the record of the case in the Patent Office.

Signed and sealed this 17th day of September, A. D., 1912.

[SEAL.]

C. C. BILLINGS,
*Acting Commissioner of Patents.*

Correction in Letters Patent No. 1,036,748.

It is hereby certified that in Letters Patent No. 1,036,748, granted August 27, 1912, upon the application of William L. Tobey, of Winthrop, Massachusetts, for an improvement in "Tire-Removing Devices," an error appears in the printed specification requiring correction as follows: Page 2, line 63, for the word "crown" read *crowd;* and that the said Letters Patent should be read with this correction therein that the same may conform to the record of the case in the Patent Office.

Signed and sealed this 17th day of September, A. D., 1912.

[SEAL.]

C. C. BILLINGS,
*Acting Commissioner of Patents.*